Figure 1:
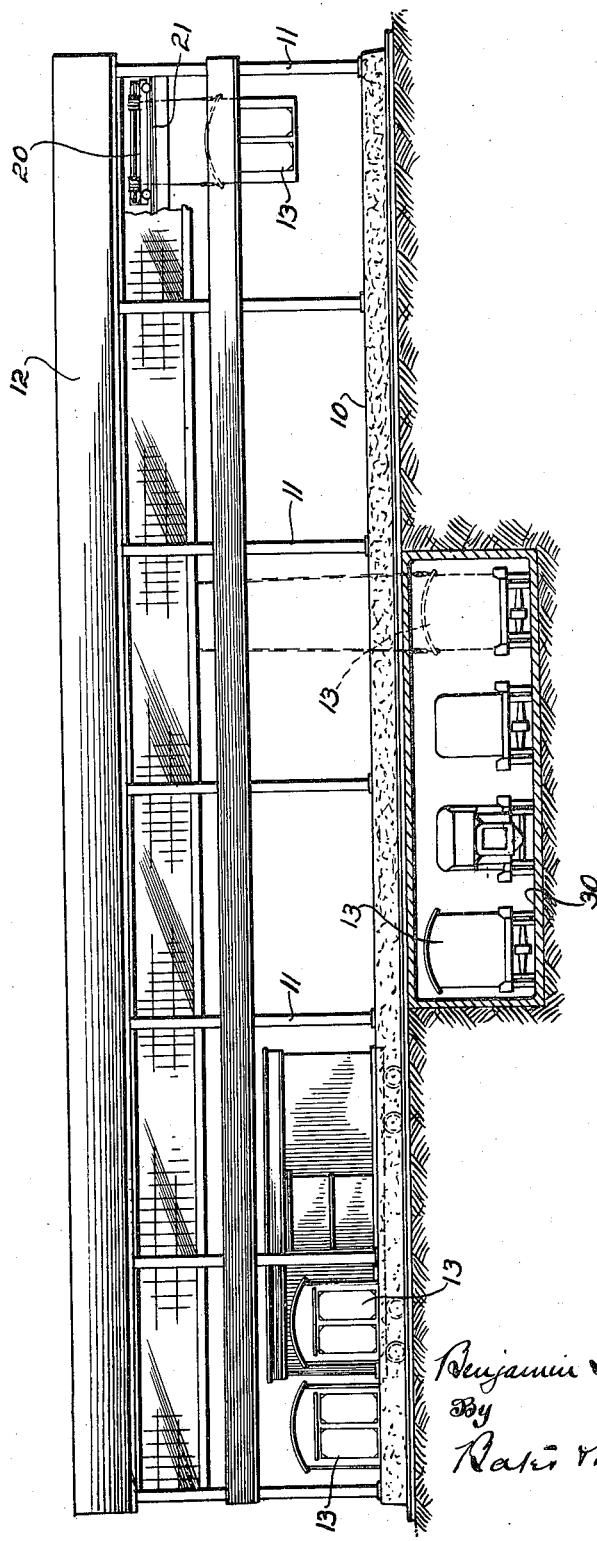

Sept. 21, 1926.

B. F. FITCH 1,600,812

APPARATUS FOR TRANSFERRING FREIGHT

Filed April 8, 1924     3 Sheets-Sheet 3

Patented Sept. 21, 1926.

1,600,812

UNITED STATES PATENT OFFICE.

BENJAMIN F. FITCH, OF GREENWICH, CONNECTICUT.

APPARATUS FOR TRANSFERRING FREIGHT.

Application filed April 8, 1924. Serial No. 704,968.

This invention relates to a system for handling freight such as is used for example in a terminal station for the distribution of package freight in less than carload lots. My invention is particularly applicable for use with a system for handling freight wherein removable automobile bodies are used for storing and transporting purposes.

In handling package freight involving less than carload lots, it is necessary, particularly at terminal stations, to "break bulk", for removing some or all of the freight and transferring it either to sub-stations or to cars for direct line movement. Usually this transfer is accomplished by positioning the cars to be loaded and unloaded adjacent the platform, and by hand trucking the freight from one car to another across the platform. These transfer cars are then destined either for direct line movement, or for sub-station transfer for similar rehandling purposes.

The handling and distribution of package freight at terminal stations necessitates considerable time in the handling of each package individually, from a transfer truck to the platform, and then from the storage place on the platform to the proper car. Accordingly, to lessen the time required for such handling and distribution I have set forth a system embodying the use of removable automobile bodies in Patent No. 1,437,968 issued to me December 5th, 1922. Briefly, that patent shows a freight platform having railroad tracks extending longitudinally, and on each side for substantially the entire length thereof. Adjacent the end of the platform, there is shown a truck runway together with suitable provision for raising an automobile body from the truck and transporting it over the platform. While the embodiment of my invention, as set forth in that patent, is suitable for certain locations, nevertheless, particularly in cities where the volume of business necessitates a platform extending several city blocks, and where the ground space is exceedingly valuable, it is difficult to provide truck run ways at the end of a platform, without causing such runways to cross railroad tracks. Moreover, certain cities prohibit the use of a freight terminal wherein vehicles must cross the grade adjacent the terminal for loading and unloading purpose.

One of the objects of my invention therefore is to provide means for permitting the normal use of the system outlined in the above mentioned patent without necessitating a grade crossing, and at the same time enable very expeditious handling of removable automobile bodies between the trucks and the platform.

A further object of my invention is tne provision of a freight platform which not only permits the normal functioning of the system outlined in the above mentioned patent, but also permits the normal flow of traffic along a public thoroughfare over which the station may extend.

The preferred means for accomplishing the above objects is illustrated in the accompanying drawings as embodying an intermediately located sub-way and will be hereinafter fully described in detail, while the essential features and characteristics will be summarized in the claims.

Figure 2:
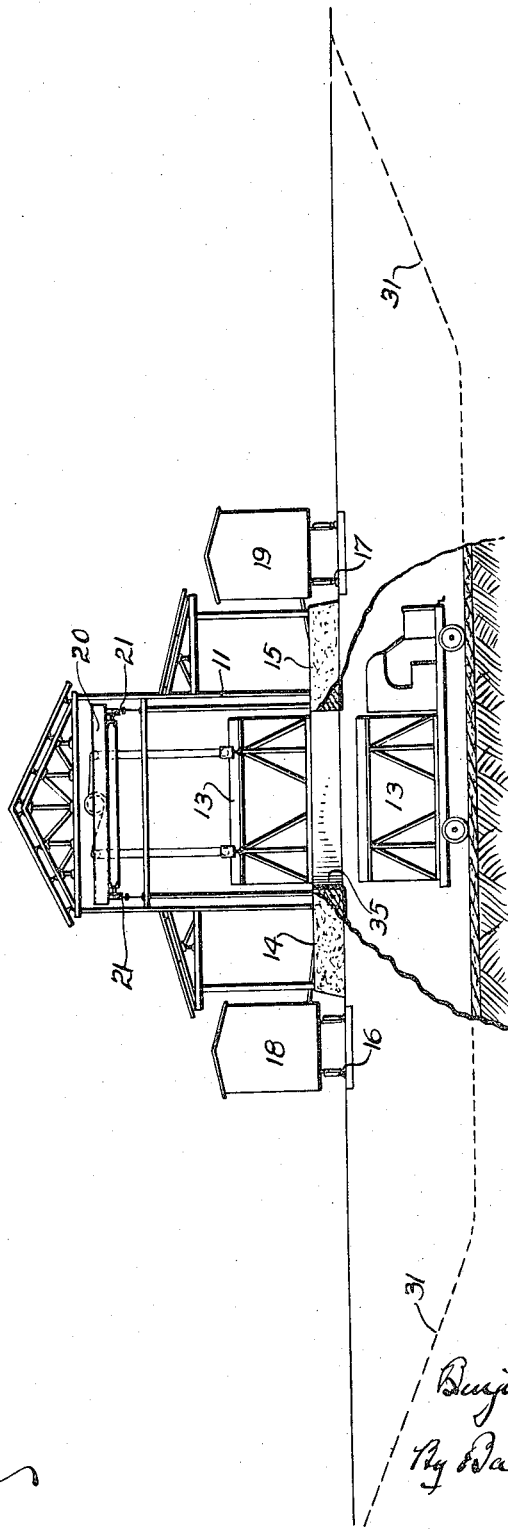
Figure 3:
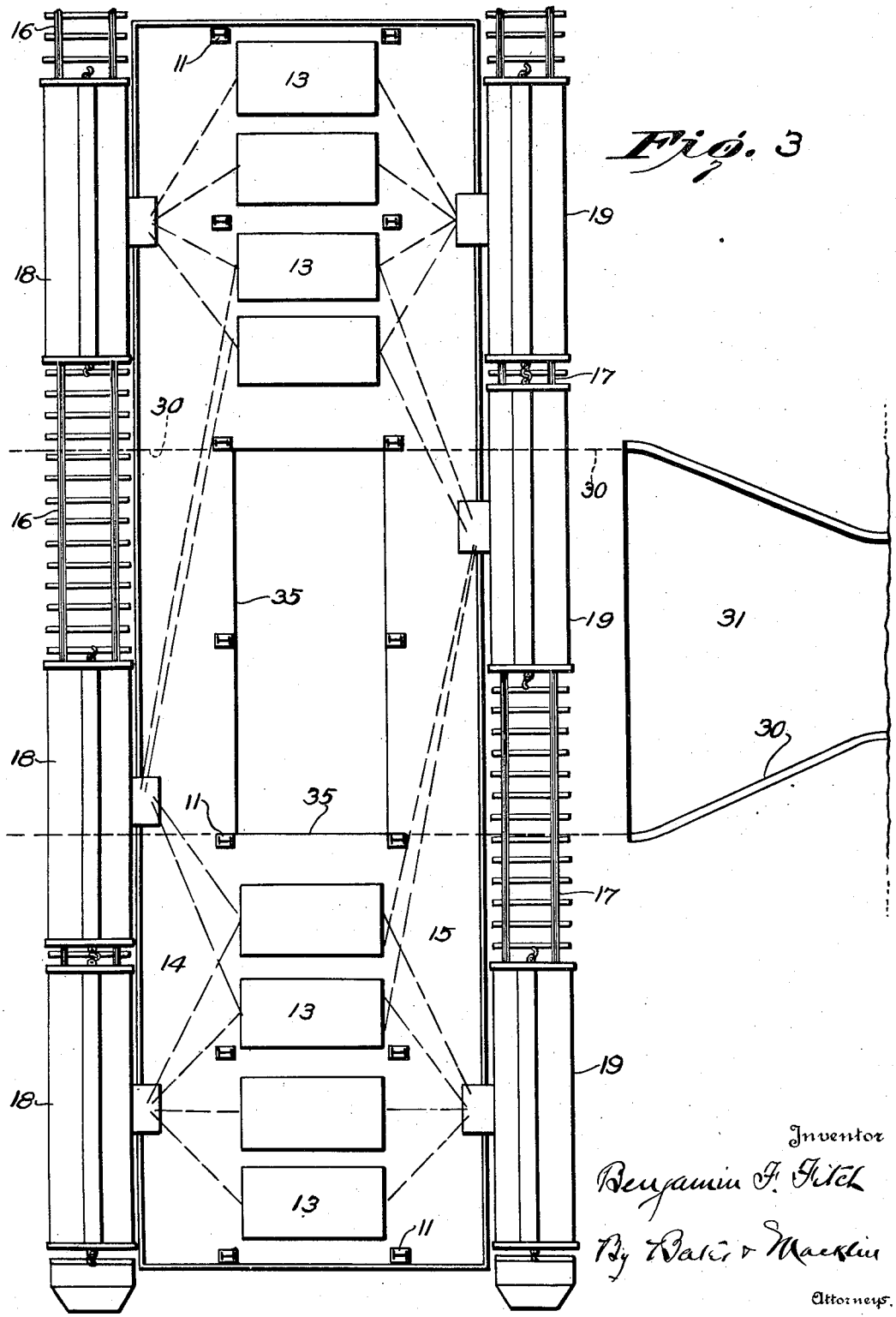

In the drawings Fig. 1 is a side elevation of a terminal station made in accordance with my invention; Fig. 2 is an end elevation, partly in section, of the station shown in Fig. 1 and Fig. 3 is a plan view of the ground floor of the station shown in Fig. 1.

I have illustrated the use of my invention as embodying a terminal station having a platform 10 which supports columns 11. The space on the platform between the columns provides for the storage of removable automobile bodies 13, while the spaces outside the columns as at 14 and 15 constitute truck run-ways for the hand trucking of freight to and from the bodies.

The station platform is arranged to be disposed intermediate sets of railroad tracks on which are positioned cars 18 and 19, which may be designated inbound or outbound respectively. The building comprising the station is illustrated as a single story structure which is provided with a crane run-way extending longitudinally thereof. A crane 20 is shown as traveling on a trackway 21 which is supported by the columns a sufficient height above the platform to permit one body to be raised, and transported over other bodies on the platform.

To bring automobile truck bodies into position to permit removal thereof from trucks, and transference to the platform, I have shown a sub-way 30 which extends transversely of the platform and which has approaches 31 leading to the street level. The width of the sub-way beneath the platform and tracks may be considerably wider than that of the approaches to permit the continuous flow of traffic along the mid-portion of the sub-way, while trucks are standing along the side portions during the period required for transferring bodies between the trucks and platform.

Thus, the subway may form the continuation of a street across which the station extends, and may provide for the uninterrupted flow of traffic exclusive of that intended for station purposes.

To transfer removable bodies between the trucks and platform, I have shown a hatch-way 35 directly beneath the crane run-way, and over the sub-way. Thus, as shown in Fig. 2, the crane 20 may be brought directly over the hatch-way for raising and lowering bodies between the trucks and the platform. By making the length of the hatch-way approximately the width of the sub-way then the crane may also be used for shifting a body from one truck to another in the event such change is required. Moreover, as shown in Fig. 1 the outer portions of the sub-way may be used for loading and unloading purposes while the middle portion of the sub-way beneath the platform may be used for the normal flow of traffic along a thoroughfare across which the station extends.

In the drawings, I have shown the subway wide enough for two trucks side by side externally of the station and four trucks beneath the station, and such is the preferred embodiment where traffic flows both ways through the subway. Where the subway is intended for traffic in only one direction it is sufficient if the external portion will accommodate one file of trucks and the portion beneath the subway three trucks side by side.

An advantage of my invention is the fact that removable bodies may be transferred between the trucks and platform, and vice versa. Moreover, the distance through which the crane must travel is materially reduced, particularly where the truck run-way is disposed adjacent the midportion of the station. This amounts to a considerable saving of time in the course of a working day. If desired, a station may have a plurality of truck run-ways at spaced intervals whereby the expansion of the station may be readily accomplished in accordance with the requirement for freight being handled.

Having thus described my invention, I claim:

1. In combination, a station platform, means for supporting transportation devices in a row extending longitudinally of the platform, a set of removable automobile bodies, an automobile truck runway extending transversely of and beneath the platform and a crane at such elevation above the platform and runway that it may raise a body from a truck on the runway, transport it over other bodies and deposit it upon the platform, the space between the platform and crane being unobstructed for substantially the entire length of the platform whereby a body may be deposited at any place upon the platform.

2. In combination, a station platform, means associated with the platform for supporting transportation devices in a row alongside the platform, a roadway on substantially the same level as said means, a truck runway communicating with the roadway and extending transversely of and beneath the platform, an automobile truck, a set of removable bodies therefor, hoisting mechanism for removing a body from a truck positioned on the runway and placing it on the platform, the space between the platform and mechanism being unobstructed for substantially the entire length of the platform whereby said body may be deposited at any place upon the platform.

3. In combination, a station platform, a set of removable automobile bodies, the platform being materially wider than the length of a body, whereby the bodies may stand transversely of the platform and leave a trucking space extending lengthwise of the platform, a set of railway trucks extending alongside the platform, an overhead truck runway extending transversely of and beneath the platform and also beneath the tracks, a ramp at one end of the runway leading downwardly to the track level, an overhead crane arranged to travel lengthwise of the platform, there being an opening in the platform above the runway whereby the crane may lift a body from a truck positioned on the runway and deposit it upon the platform, the crane runway being unobstructed for substantially the entire length of the platform, whereby the crane may transport a body and deposit it at any place upon the platform.

4. In combination, a station platform, a set of railway tracks extending longitudinally of the platform, and substantially on the same level therewith, a depressed truck runway extending beneath the platform and transversely thereof, a ramp leading upwardly from each end of the runway to the track level and an overhead crane adapted to travel longitudinally of the platform, the space between the platform and the crane being unobstructed for substantially the entire length of the crane runway whereby the crane may raise a body from the truck on the runway, transport it over other bodies and deposit it at any place upon the platform.

5. In combination, a station platform, a set of railway tracks extending alongside the platform, a roadway leading away from the tracks at substantially the same level as the tracks, said roadway constituting a public thoroughfare, a set of removable automobile bodies adapted to be positioned side by side on the platform, a depressed truck runway extending transversely of and beneath the platform, there being a ramp leading upwardly from the runway at each end thereof for making the runway constitute a continuation of the public thoroughfare and a traveling crane extending longitudinally of the platform, and adapted for raising bodies from trucks and transporting them over other bodies on the platform, the crane runway being unobstructed for substantially the entire length of the platform whereby a body may be deposited at any place upon the platform.

In testimony whereof, I hereunto affix my signature.

BENJAMIN F. FITCH.